United States Patent Office 3,543,339
Patented Dec. 1, 1970

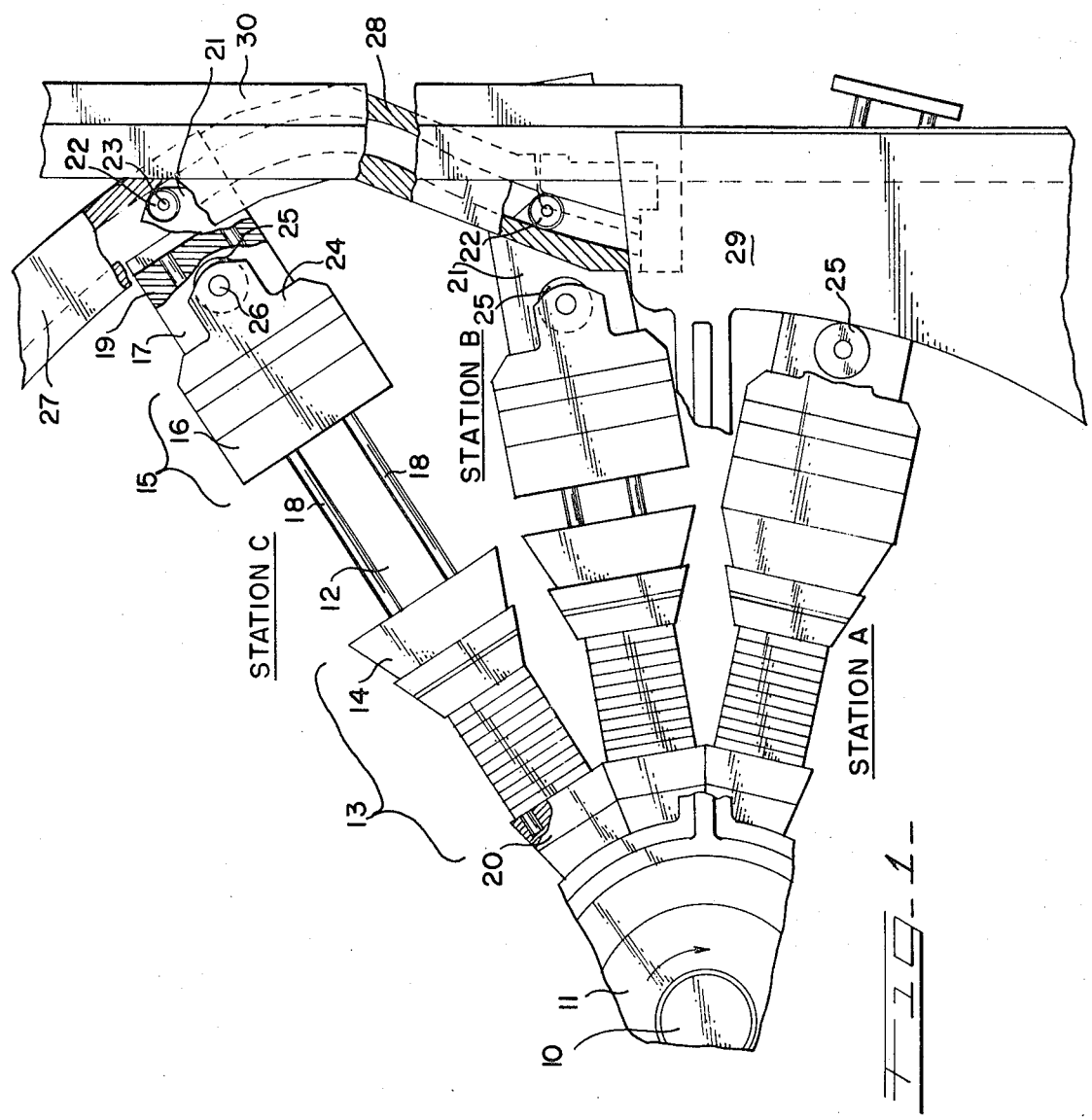

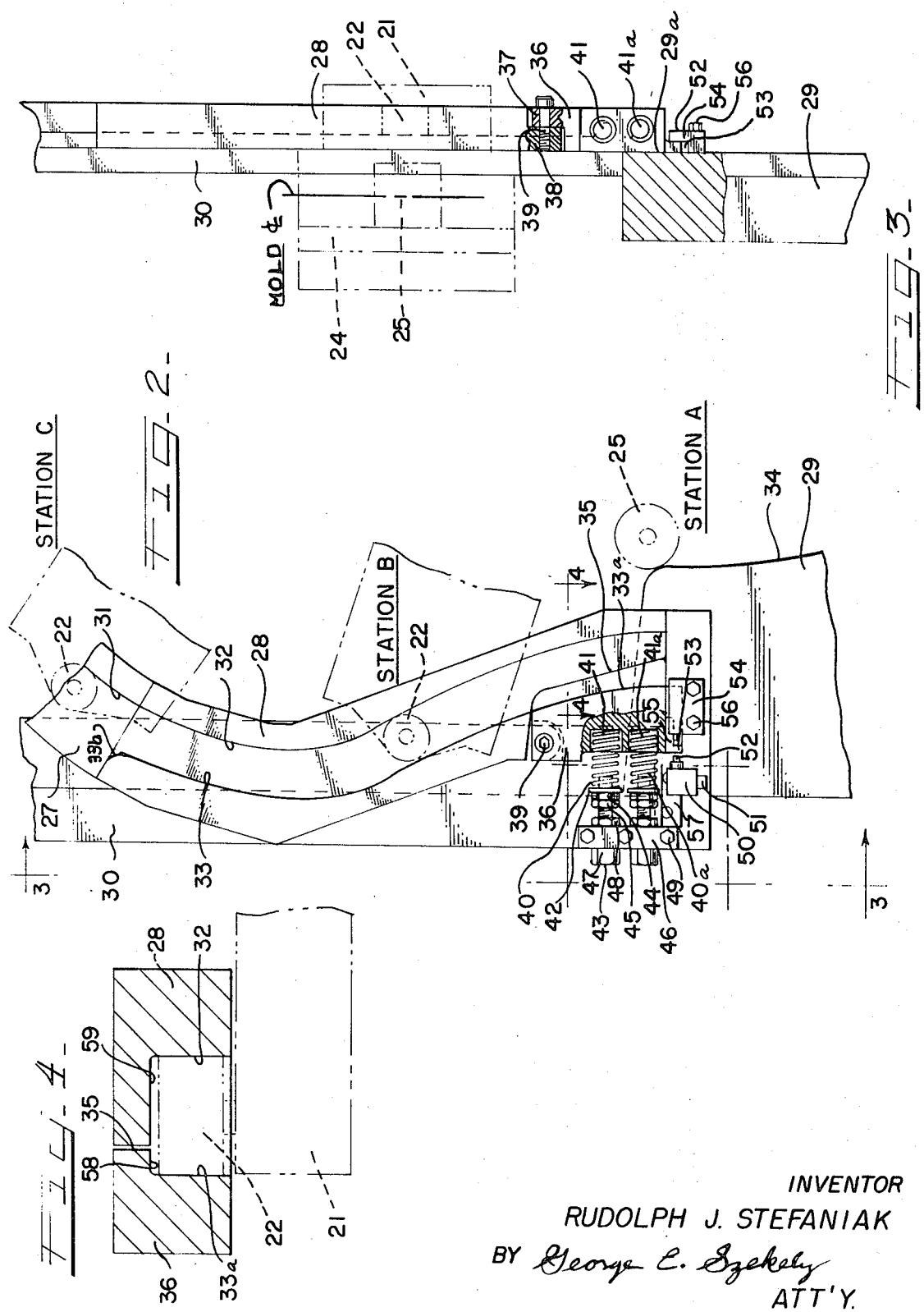

3,543,339
BLOW MOLD CLOSING APPARATUS
Rudolph J. Stefaniak, Munster, Ind., assignor to Continental Can Company, Inc., New York, N.Y., a corporation of New York
Filed Jan. 15, 1968, Ser. No. 697,665
Int. Cl. B29d 23/03
U.S. Cl. 18—5                                    18 Claims

ABSTRACT OF THE DISCLOSURE

A closing cam segment of the radial cam type, with safety overload trip. A cam follower fixed to a radially movable mold half rides along a cam track as the mold wheel rotates. The closing transition section of the cam track is profiled to slide the mold half inward toward closed position. As the sliding mold half approaches closed position, the follower bears on a pivoted load relief member constituting part of the transition track section. Springs bias the member toward normal camming position. Should the resistance to closing the mold exceed a predetermined value corresponding to the value of the opposing spring bias, the relief member section pivots outward and trips a limit switch, stopping the machine.

BACKGROUND OF INVENTION

Field of invention

This invention relates to vertical rotary blow mold machines of the general type exemplified in U.S. Pat. No. 2,784,452, issued Mar. 12, 1957 to Herbert S. Ruekberg and John L. Szajna. Such machines have a mold wheel mounted on a horizontal shaft, the molds being carried on spider arms for rotation with the wheel. Outer mold halves are arranged to slide radially along the spider arms, the halves moving inward to close the molds and outward to open them. Followers carried by the sliding mold halves travel a radial cam track comprised of segments affixed to the machine frame. As the mold wheel rotates, the cam effects opening and closing of the molds at appropriate times in the molding cycle, the nature of which is explained in detail by the aforesaid patent.

The prior art

In one stage of a blow molding cycle, the mold closes on a parison which has been set in the open mold. A vertical rotary machine is usually so arranged that the closing stage occurs as the mold travels between a position upward of the horizontal centerline of the machine and its position along that horizontal centerline. Thus, the movable mold half tends to "fall" into its closed position, except as it may be restrained by the cam. In normal operation there is little or no outward force on the cam track, the wheel speed generally being quite low, so that there is only a small centrifugal force counter to the gravitational component tending to slide the mold radially inward. However, it sometimes occurs that a maladjustment or malfunction of the machine effects a condition such that the mold encounters an inordinately high resistance to its closing motion. For example, a failure may occur in the preceding knockout step, so that the article molded in the preceding cycle remains in the mold when a new parison is set in. In other cases, a parison may be improperly set, the mold halves may have become misaligned, or the mold carriage binds on its guides. Under adverse conditions such as those described, the resistance to mold closing will obviously be unusually high as compared to normal operation, often to an extent resulting in severe damage to the mold, carriage, follower, cam, or other part of the machine. Furthermore, certain such malfunctions may be of the progressively deteriorating type, in which cases improper functioning may continue for a number of cycles before visual detection, with consequent excessive spoilage.

Another problem not resolved with entire satisfaction in prior designs pertains to irregularities in the transition from open to closed mold positions. As seen from the representative prior design of the aforesaid Ruekberg and Szajna patent, the overlapping of opening and closing cam segments through the transitional or "fall" zone introduces a moment or couple between the opening and closing followers which tends to aggravate motion irregularity induced by necessary clearances and various impact and vibratory loads imposed on the wheel and the machine frame by molding operations proceeding in other parts of the cycle, while a particular mold is in transition from open to closed position. As a consequence, there may often be an undesirable flutter or chatter of the mold half passing along the fall cam segment, compounding vibration and shock effects.

Prior cam track and follower arrangements also involve a substantial increment of wheel radius beyond that otherwise required for the mold assemblies, adding substantially to head room requirements, floor space and clearance requirements generally.

SUMMARY OF THE INVENTION

It is an object of this invention to provide in a rotary blow molding machine means responsive to excessive mold closing resistance whereby to bring the machine immediately to a stop upon such malfunction.

It is a further object of this invention to provide a cam track for a blow molding machine, wherein a member constituting a portion of the track segment is movable under effect of forces resisting closing of the mold, such portion being biased to camming position for closing the mold, excessive closing resistance overcoming the bias and moving the track segment member to actuate the limit switch, thereby stopping the machine drive.

It is a still further object of this invention to provide in a blow molding machine a transitional cam track segment controlling movement of a mold half from open to closed position, wherein the follower is closely confined against departure from the track in either radial direction, and therewith to provide a compact transition structure and follower arrangement, whereby to minimize flutter and chatter in the transition and generally to facilitate a smooth transition from open to closed mold position.

This invention attains the foregoing objectives by a novel arrangement of the transition from open to closed mold condition. The transition cam segment includes dual tracks closely capturing a follower associated with the radially movable mold half during the transition traverse. Load relief means includes a pivotal load relief member at the closing end of the transition segment having a cam surface which constitutes a continuation of the transitional closing track. Spring bias of predetermined value urges the relief member to its normal camming position. Should resistance to mold closing exceed normal amount, the resultant excessive follower pressure against the relief member overcomes the bias, whereupon the member pivots and trips a limit switch, stopping the machine.

BRIEF DESCRIPTION OF THE DRAWINGS

FIG. 1 is a partially schematic, fragmentary front elevation of a blow molding machine incorporating the novel apparatus of this invention, with certain portions broken away and other portions in section to show details;

FIG. 2 is an enlarged rear elevation of the cam segment portion shown in FIG. 1, with the followers and portions of the mold carriage in phantom outline to show the positions thereof relative to the cam track;

FIG. 3 is a side elevation of the track segment of this invention, taken on line 3—3 of FIG. 1; and FIG. 4 is a section of the transition cam segment taken on line 4—4 of FIG. 2, the follower and a portion of the mold carriage being in phantom outline, to show the relative position of the parts in this view.

PREFERRED EMBODIMENT

The general construction and arrangement of the machine, except as otherwise here shown and described, is substantially like the machine shown and described in the aforesaid Ruekberg and Szajna patent.

Referring to FIG. 1, horizontal shaft 10 carries hub 11 for rotation therewith. Shaft 10 may be driven by any suitable means, such as a motor and gear reducer, or the like, not shown, at a speed on the order of 4 r.p.m. A plurality of arms 12 are affixed to the hub 11, constituting therewith a spider or mold wheel. The number of arms 12 is determined according to space and process timing limitations. In this case, arms 12 are shown spaced as for a 14-station machine, only three of the arms being shown in FIG. 1.

Each arm 12 carries mold equipment consisting of an inner mold assembly 13 having an inner mold half 14 outermost thereon and an outer mold assembly 15 having an outer mold half 16 innermost thereon, opposing inner mold half 14. Inner mold half 14 is in a fixed position along arm 12. Outer mold half 16 is mounted with the other parts of mold assembly 15 on a slide carriage 17, arranged to move freely along arm 12 in a radial direction, to and from fixed inner mold half 14. For this purpose, the carriage 17 is slidably supported on parallel rods 18 which are anchored at their outer ends in a yoke 19 affixed to arm 12, rods 18 extending inwardly therefrom through inner mold assembly 13 to an inner anchorage in block 20. The several stacked components of the inner mold assembly 13 and outer mold assembly 15 are so located upon or with reference to guide rods 18 that inner mold half 14 and outer mold half 16 will at all times be in proper alignment with each other. A suitable structure is shown in greater detail in the aforesaid Ruekberg and Szajna Pat. 2,784,452, the particular arrangement not forming part of this invention.

A bracket 21 extending from carriage 17 supports a follower 22 on a horizontal shaft 23. A bracket 24 extending from outer mold assembly 15 carries another follower 25 on its horizontal shaft 26.

The radial cam here involved and shown in essential part comprises an opening segment 27, a transistion segment 28 and a closing segment 29, supported on machine frame 30. For purposes of manufacturing convenience and economy the several segments may be made as separate parts, as shown, then assembled and secured in position for desired camming engagement with followers 22 and 25.

FIGS. 2 to 4 inclusive show details of the cam segment arrangement and structure, the track profiles being best seen in FIG. 2, taken from the rear of the machine as viewed in FIG. 1. Cam tracks comprise an open-dwell track 31 in segment 27, dual concentric tracks 32 and 33 in segment 28, track 32 being a continuation of track 31, and track 34 in segment 29. Tracks 31, 32 and 33 associate with followers 22, while track 34 associates with followers 25.

The lower end of transition segment 28 is partially cut out along line 35, the downwardly extending leg of which is in a plane between the downward continuations of tracks 32 and 33. The cutout is provided to accommodate load relief means, which includes a relief block member 36 fitted in the space bounded by the cleavage line 35, thus constituting an articulate continuation of segment 28.

Member 36 is generally of the same depth as the body of segment 28, but, as best seen in FIG. 3, the outermost upper corner of member 36 is cut away to define a lug 37, which laps an opposing lug 38 depending from the body of segment 28. A horizontal pin 39 extending through lugs 37 and 38 pivotally suspends block 36 upon segment 28.

As best seen in FIG. 2, loads relief member 36 has a face 33a extending the full length thereof along the line radially outward of the cleavage line 35. In the normal position of member 36, as shown, face 33a constitutes a smooth continuation of track 33. In order best to assure such track continuity, profile accuracy and manufacturing economy, segment 28 and member 36 are finish profiled with the parts clamped in assembled position as for normal camming action, that is, the closed position shown in FIG. 2.

Load relief member 36 is held in its normal, or closed, position by springs 40 and 40a bearing in spring pockets 41 and 41a, along the face of member 36 opposite to the cleavage line 35 and track 33a. As apparent in FIG. 2, the spring assemblies consist essentially of counterparts, hence further description is referenced merely to spring 40. Spring 40 bears against washer 42, which is positioned upon spring support stud 43 by nut 44 and locked in position by jam nut 45. Stud 43 is anchored to support block 46 by means of nut 47 and jam nut 48. Block 46 is affixed to frame 30 in any suitable manner, as by capscrews 49. Desired pre-compression of spring 40 is obtained by adjusting nut 44. The arrangement described facilitates setting and adjustment of springs 40 and 40a for selected total bias and balancing to compensate for leverage differential, as well as providing adjustment to compensate for assembly variations.

A limit switch 50 is secured to frame 30 by means of a bracket 51. Switch 50 is positioned below spring 40a, with switch plunger 52 opposing actuator 53, which is affixed to the lower end of relief member 36. Facing 29a closely opposes the inner face of member 36. Guide block 54, opposing actuator side-face 55, and head 39a of pin bolt 39, opposing lug 37, constrains member 36 in true pivot plane along facing 29a. The guidance and constraint obviate cocking, binding or twisting which otherwise might result by virtue of the short journalling and offset suspension of lug 37 on pin 39. Cap screws 56 adjustably clamp guide 54 to segment 29.

OPERATION

For the sake of clarity, the three arms 12 with their mold assemblies 13 and 15 are designated stations A, B, and C in the order which they travel clockwise as viewed in FIG. 1 the direction of wheel rotation indicated by the arrow. Where necessary to differentiate references to identical parts at the several stations, such part reference numerals are hereafter prefixed by the appropriate station letter, A-22 representing the follower 22 at station A, for example.

At station C the mold C-14, C-16 is fully open, outer half C-16 being held in the open position by virtue of follower C-22 bearing on cam track 31, inward of follower C-22. At this angular position a substantial component of gravitational force imposed by the weight of mold assembly 15 and its carriage 17 is directed radially inward, holding follower C-22 on track 31. At the very low rotative speed of the mold wheel, the centrifugal force exerted by carriage 17 is substantially less than the gravitational component at the position of station C, therefore no inward restraint is required. However, at station B, arm B-12 is nearing horizontal, wherefore it is desirable to provide radial restraint in both directions, by means of cam tracks 32 and 33.

The profiles of tracks 32 and 33 are homologous harmonics, with the upper or entering leg of track 32 at the leaving radius of track 31, radius here being referred to the center of the mold wheel. The leaving radius of track 32 is less than its entering radius by the amount representing the stroke required to close the mold, that is, the distance between mold halves 14 and 16, FIG. 1, station C. Segments 28 and 29 overlap circumferentially, so that as the follower 22 approaches the leaving end of segment 28, the closing and holding load is transferred to follower 25 on track 34 of segment 29, follower 22 thereafter being carried idle until returned to the opening segment.

In the early mold closing stage, substantially the only resistance to mold closing is carriage friction, which is negligible with a well-constructed carriage, mold and guide assembly. Net radial thrust will be inward, due to gravitational component, which is borne by follower 22 bearing on track 32. In normal operation, substantial radially outward force is encountered only from the clamping force as the mold closes, at which stage follower 22 is traversing the lower, or radially innermost, end of the transition segment 28. At this stage, follower 22 opposes track portion 33a on relief member 36, radially outward of follower 22. Springs 40 and 40a are so selected, calibrated and adjusted that normal mold clamping force transmitted by follower 22 against member 36 along track 33a will not overcome the bias effected by the springs, so that member 36 remains stationary in normal operation. However, should there be an abnormally high resistance to closing of the mold, as from malfunction or maladjustment, springs 40 and 40a will yield, allowing member 36 to pivot outwardly about pin 39, depress plunger 52 and trip the limit switch 50. Limit switch 50 is an element in the machine drive control circuit (not shown), which may be any of such circuits well known in the control art as may be best suited to stop or disconnect the drive and to bring the machine to a substantially immediate stop upon actuation of limit switch 50. Similarly, limit switch 50 may be either normally open or normally closed, according to whether employed in control of a motor, magnetic brake, throwout clutch, or other drive component, and whether in circuit or on relay.

As seen in FIG. 2, the axis of limit switch plunger 52 is substantially more remote from the axis of pivot 39 than the axes of springs 40 and 40a. Thus a small spring deflection corresponds to a larger stroke of plunger 52, permitting selection of a simple-direct-acting switch 50, without sacrifice of sensitivity, and yet of sufficient stroke to minimize false tripping by shock or vibratory displacement. A stop block 57 is provided, to limit throw of relief member 36 to the safe stroke of plunger 52, dispensing with complex trip overrun mechanism. Location of the bias axes close to the pivot center provides substantial mechanical advantage for load on member 36 in the critical zone at the lower end, most remote from pivot 39. This arrangement permits selecting springs of high load/deflection characteristics, exemplified by a closely-wound, heavy-gauge spring. A spring of such characteristics is least susceptible to fatigue failure, calibration inaccuracies, hysteresis error, false deformation by transient loads of shock and vibration, and like aberrations. Although a pair of coiled compression springs is preferred for the sake of simplicity, economy, dependability and space conservation in the structure shown, it will be understood that other arrangements, other styles of springs, such as torsion or leaf, or other bias means, such as dashpots, may be used, as may best suit the particular construction and load requirements.

For structural reasons and for best accommodation of the various appurtenances and molding operations, it is generally desirable that the cam segments be located externally of the principal portions of the mold assemblies, as here shown. In such arrangement opening restraint is provided by follower 22 bearing on the external rim track 31, necessitating that the follower bracket 21 extend beyond the rim of segment 27, with follower 22 overhung. Since the mold opening and suspension loads are moderate, such follower and cam track arrangement is quite practicable for the open-mold portion of the molding cycle. However, the cam bearing load imposed by closing restraint is much greater than that for open-mold conditions, comprising not only a substantial initial clamping load but the blowing-pressure load as well, which latter is particularly high when molding large, intricate articles. Such loads can be practically sustained only by means of a heavy-duty follower in a simple-beam suspension in line with the load, as represented by the arrangement best seen in FIG. 3, wherein the wide-faced follower 25 is suspended in the yoke of bracket 24 with the follower bearing center in the plane of the mold centerline. Provision must then be made for transferring mold assembly control from follower 22 to follower 25. In prior machines this transition has been accomplished by circumferentially overlapping the opening cam segment and the closing cam segment, the equivalents of segments 27 and 29 herein. For such an arrangement, structural considerations have required that the opening cam track be spaced a substantial distance radially outward of the closing track through the "fall" or transition segment, with correspondingly wide radial spacing between the two followers. Since the radius of the closing track, track 34 herein, has its minimum value predetermined essentially by the depth of the mold assembly, the increment of radial follower span establishes an irreducible minimum arm length, head room and space requirement. Furthermore, in the zone near the horizontal arm position, just preceding clamping of the mold, there is a zone of near balance between radially outward and radially inward load components through which the moving mold assembly "floats." Due to unavoidable variations in arm assemblies and other operating factors, a particular angle at which shift in direction of cam loading occurs cannot be precisely established for all setups. Therefore, provisions for dual restraint must be made through a substantial angle of the cam. With allowance for some clearance, tolerances and assembly variations, to insure against binding, there has been a tendency of prior carriage and mold assemblies to hunt or flutter while traversing the fall cam segment, resulting in deleterious chattering or vibration, which may be aggravated by other shock or vibratory effects of operations with molds in other stages of the molding cycle.

The cam structure and arrangement of this invention eleminates or substantially alleviates the objectionable characteristics found in prior cams of the general type involved. The precision follower 22 is a very close running fit in the groove defined by tracks 32 and 33 of transition segment 28. The tracks being formed in the same piece and closely spaced, finishing to precision homology and equidistance is greatly facilitated. Corner 33b, at the juncture of segments 28 and 27 is radiused to obviate galling, snagging or pounding as the follower 22 enters the cam groove. Track portion 33a, traversing relief member 36, is set back from the cleavage line 35 defining backing flange 58, complementary to the backing 59 extending along the cam groove in the remainder of segment 28. As seen in FIGS. 2 and 4, track and backing continuity are thus provided without parting lengthwise of the track profile, simplifying close fitting of the member 36 to the body of segment 28.

Tracks 32 and 33 provide close, dual restraint through the entire critical fall zone, obviating hunt or flutter. Since the dual restraint is effected through the single follower 22, it is not necessary to have a long cam segment overlap for transfer of load from opening to closing follower, as heretofore required. As seen in FIGS. 1–3, a short overlap between segments 28 and 29 suffices to insure continuity of control. The cam structure is radially compact, permitting shorter radial center distance between followers 22 and 25, an opening segment 27 of minimal radius for given radius of closing track 34, and a radially compact carriage 21, generally resulting in a wheel and frame assemblage of smaller overall height and width than otherwise achievable. Furthermore, since only follower 22 engages the cam during the transition zone between opening and closing segments, there is no danger of developing a radial couple between followers 22 and 25. In prior designs, involving engagement of both followers with their respective tracks during transition cam traverse, slight discrepancies in profile matching, together with flutter effects, have tended to create a couple in the radial plane through the follower axes, with corresponding tendency to warp and bind the carriage and guide assembly. The novel cam transition of this invention obviates such hazards.

The foregoing description presents a preferred form of this invention. Those skilled in the art will be enabled to devise other embodiments and adaptations within the spirit and scope of the appended claims by which this invention is defined.

I claim:

1. In mold control apparatus for a molding machine including a split mold and cam track means arranged for relative movement, a part of said mold being movable to close said mold during said relative movement, and follower means carried with said mold part in position for camming association with said cam track means for closing said mold, said track means having a normal camming position whereat said follower means bears thereon with a force including mold closing resistance load, load relief means comprising: a member defining a relatively displaceable articulate portion of said track means; and bias means yieldably biasing said portion toward said normal position.

2. The invention according to claim 1, wherein said bias means comprises spring means bearing on said member counter to said force.

3. The invention according to claim 1, wherein said mold is revolvable relative to said track means about an axis, said mold part being movable radially of said axis for closing said mold, said track means being so profiled as to move said mold part in closing direction as said follower traverses said track means in the direction of mold revolution said member being mounted for pivotal movement counter to the bias of said bias means under effect of said force.

4. The invention according to claim 3, wherein said bias is imposed linearly along an axis remote from the pivotal axis of said member, said track profile extending along said member in mold-closing direction to a terminus more remote from said pivotal axis than said bias axis.

5. The invention according to claim 3, further including limit control means actuable by said pivotal movement of said member, said control means being adapted for association with a control system to arrest said relative movement upon actuation of said control means.

6. The invention according to claim 5, wherein said control means comprises limit switch means arranged for actuation by moving contact of said member acting thereon generally along an axis remote from the pivotal axis of said member.

7. The invention according to claim 6, wherein said bias means comprises a compression spring opposing said member along a face thereof opposite to said track means, the axis of said spring being remote from the pivot axis of said member, said switch means including a plunger actuator opposing said member along an axis generally parallel to said spring axis and remote from said pivot axis, whereby said force of value sufficient to overcome said bias causes said member to actuate said switch.

8. The invention according to claim 7, wherein said plunger actuator axis is more remote from said pivot center than said spring axis.

9. In a radial cam adapted to control the opening and closing of a split mold in a rotary molding machine, said mold including a follower carried with a part of said mold in position for traversing said cam, the combination of: an opening segment; a closing segment; and a transition segment in intermediate cam traverse between said opening and closing segments, said opening segment having a track portion terminating toward said transition segment and adapted to restrain said mold part in open position, said closing segment having a terminal track portion adapted to restrain said mold part in closed position, said transition segment having dual, concentric opposing tracks extending between said track portions and spaced for close capture of said follower, said dual tracks being profiled so as to move said mold part toward closed position as said follower traverses said tracks in a path from said opening segment to said closing segment.

10. The combination according to claim 9, wherein a first one of said dual tracks constitutes an uninterrupted continuation of said opening segment track portion.

11. The combination according to claim 10, wherein the radial distance between the ends of said dual tracks adjacent said opening segment and their ends adjacent said closing segment corresponds substantially to the radial travel required to move said mold part to closed position from its open position established when said follower is at the juncture of said opening and transition segments.

12. The combination according to claim 11, wherein the second one of said dual tracks constitutes a closing track, a portion of said second track lying along a member movably connected to the body of said transition segment at its end toward said closing segment, said member in its normal camming position constituting a substantially uninterrupted continuation of said transition segment.

13. The combination according to claim 12, wherein said transition segment is provided with a groove defining said dual tracks, a cleavage line between said member and said body extending generally between said dual tracks along the bottom of said groove, a first groove portion along said member being defined by said first one of said dual tracks and a first groove bottom portion in said body, a second groove portion being defined by said second one of said dual tracks and a second groove bottom portion in said member, said groove portions together constituting a substantially uninterrupted continuation of said groove, when said member is in said normal position relative to said body.

14. A rotary blow-molding machine, comprising: a wheel having a plurality of arms, each said arm carrying a split mold, a part whereof is radially movable along said arm for opening and closing said mold; a radial cam generally surrounding said wheel, said cam and said wheel being arranged for relative rotation, said cam including opening, transition and closing segments; and a follower carried with said mold part, for periodically traversing said segments, in course of said relative rotation, and passing from said opening segment to said closing segment across said transition segment, said transition segment including a transition track, arranged for urging said follower in a direction to effect said closing during said traversing movement, a portion of said transition track lying along a member generally radially movable relative to the body of said transition segment upon imposition of a predetermined force of said follower bearing against said transition track portion in reaction to mold closing resistance.

15. A machine according to claim 14, further including yieldable means biasing said member to normal mold-closing position of said track portion, said bias means being calibrated for yielding upon imposition of said predetermined force.

16. A machine according to claim 15, still further including switch means opposing said member for actuation of said switch means upon yielding of said bias means, said switch means being adapted for association with electrical control means to stop said rotation upon said actuation.

17. A machine according to claim 14, wherein said transition segment includes a second track homologous with said transition track, and uniformly spaced therefrom, said tracks defining a cam groove closely fitting said follower, said groove extending from said opening segment toward said closing segment and continuing along said member at the end of said transition segment toward said closing segment.

18. A rotary blow-molding machine, comprising: a wheel having a plurality of arms, each said arm carrying a split mold, a part whereof is radially movable along said arm for opening and closing said mold; a radial cam generally surrounding said wheel, said cam and said wheel being arranged for relative rotation, said cam including opening, transition and closing segments; a follower carried with said mold part in position for periodically traversing said transition segment in course of said relative rotation in a direction from said opening segment to said closing segment, said transition segment including a transition track arranged for urging said follower in a direction to effect said closing during said traversing; and load relief means responsive to force of said follower against said transition track for stopping said traversing when said force exceeds a predetermined value corresponding to maximum safe mold-closing resistance load.

References Cited
UNITED STATES PATENTS

| | | | |
|---|---|---|---|
| 2,543,292 | 2/1951 | Kany | 25—2 |
| 2,579,399 | 12/1951 | Ruekberg | 18—5 |
| 2,784,452 | 3/1957 | Ruekberg et al. | 18—20 X |
| 3,019,481 | 2/1962 | Negoro | 18—20 X |
| 3,310,834 | 3/1967 | Simpson et al. | 18—5 |
| 3,334,379 | 8/1967 | Di Settembrini | 18—20 X |

J. SPENCER OVERHOLSER, Primary Examiner

M. O. SUTTON, Assistant Examiner

U.S. Cl. X.R.

192—150